(12) United States Patent
Snyder

(10) Patent No.: US 7,185,162 B1
(45) Date of Patent: Feb. 27, 2007

(54) METHOD AND APPARATUS FOR PROGRAMMING A FLASH MEMORY

(75) Inventor: Warren Snyder, Snohomish, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 395 days.

(21) Appl. No.: 09/875,599

(22) Filed: Jun. 5, 2001

Related U.S. Application Data

(60) Provisional application No. 60/243,708, filed on Oct. 26, 2000.

(51) Int. Cl.
*G06F 12/14* (2006.01)

(52) U.S. Cl. .................... 711/165; 711/103; 711/163

(58) Field of Classification Search ............. 710/58, 710/60; 711/102–103, 165, 163
See application file for complete search history.

(56) References Cited

U.S. PATENT DOCUMENTS

| 5,202,687 | A |   | 4/1993  | Distinti ............... 341/158 |
| 5,630,057 | A | * | 5/1997  | Hait .................... 726/29  |
| 5,969,632 | A | * | 10/1999 | Diamant et al. ........ 340/5.3  |
| 6,009,496 | A | * | 12/1999 | Tsai .................... 711/103 |
| 6,144,327 | A |   | 11/2000 | Distinti et al. ......... 341/126 |
| 6,219,729 | B1| * | 4/2001  | Keats et al. ........... 710/58  |
| 6,236,593 | B1| * | 5/2001  | Hong et al. ........... 365/185.11 |
| 6,324,628 | B1| * | 11/2001 | Chan ................... 711/163 |
| 6,460,172 | B1|   | 10/2002 | Insenser Farre et al. .. 716/17 |
| 6,754,765 | B1| * | 6/2004  | Chang et al. .......... 711/103 |
| 6,839,774 | B1| * | 1/2005  | Ahn et al. ............. 710/14  |

FOREIGN PATENT DOCUMENTS

EP            1191423 A2 *  3/2002

OTHER PUBLICATIONS

Hwang et al., Sep. 24, 2002, Derwent acc. No. 2002-758861.*
CYPR-CD00232; "Programmable System on a Chip"; Oct. 10, 2001; U.S. Appl. No. 10/033,027; W. Snyder.

* cited by examiner

*Primary Examiner*—Pierre Bataille
*Assistant Examiner*—Hetul Patel

(57) ABSTRACT

A method and apparatus for programming nonvolatile (flash) memory in a microcontroller. A nonvolatile memory in the microcontroller is connected via data, address and control signal paths to a processor internal to the microcontroller. These paths are not available to the outside world. In order to program the nonvolatile memory, a tester/programmer provides instructions to a test/control interface and the actual programming of the nonvolatile memory is carried out under control of a supervisory ROM forming a part of the microcontroller storing instructions which are carried out by the processor.

25 Claims, 4 Drawing Sheets

METHOD AND APPARATUS FOR PROGRAMMING A FLASH MEMORY

CROSS REFERENCE TO RELATED DOCUMENTS

This application is related to and claims priority benefit under 35 U.S.C. §119(e) of provisional patent application Ser. No. 60/243,708 filed Oct. 26, 2000 to Snyder, et al. entitled "Advanced Programmable Microcontroller Device" which is hereby incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to the field of microcontrollers. More particularly, this invention relates to a method and apparatus for controlling the programming of nonvolatile memory (e.g., Flash memory) forming a part of the microcontroller.

BACKGROUND OF THE INVENTION

Microcontrollers such as 100 depicted in FIG. 1, generally include a processor (Central Processing Unit) 106 and associated Random Access Memory (RAM) 110 as well as a block of nonvolatile memory 116, generally flash memory, used to store a user program. By using a block of user programmable nonvolatile memory 116, the microcontroller may be customized to carry out any desired function within the capabilities of the device. Numerous techniques exist for programming the user program into the nonvolatile memory 116. In general, such techniques may be characterized by use of an external tester/programmer 120 coupled directly to the nonvolatile memory 116. The tester/programmer 120 utilizes a control signal line 124 to appropriately signal the nonvolatile memory 116 (as well as associated circuitry within the microcontroller 100) that a programming mode is being entered. An address line, path or bus 130 is then used to identify memory locations within the nonvolatile memory 116 being programmed. Data is transmitted to the nonvolatile memory 116 over a data line, path or bus 138. When all address locations have been appropriately programmed within the nonvolatile memory 116, the tester/programmer 120 issues appropriate control signals on control path 124 to terminate the programming process.

The details of the exact programming process vary from manufacturer to manufacturer and from part to part. However, the above characterization generally describes the process used. Unfortunately, the process of programming the microcontroller 100 as depicted in FIG. 1 presents a number of problems. The need to bring control data and address lines to the outside requires that the microcontroller 100 frequently have more I/O (input/output) pads on the processor then might otherwise be necessary. In addition, the external accessibility to control path 124, address path 130 and data path 138 renders microcontroller 100 susceptible to unauthorized memory reads, programming or reprogramming. This may present a serious security problem making microcontroller 100 vulnerable to unauthorized modification of a user program including potentially infecting the user program with "bugs" and "viruses".

In addition to the above drawbacks, microcontroller 100 requires external interconnection with a programmer/tester any time the nonvolatile memory 116 is to be programmed. Thus, there is no provision for processor 106 itself to invoke a reprogramming "on the fly". In many applications for microcontrollers it would be an advantage to have the processor 106 invoke a reprogramming of certain memory locations within nonvolatile memory 116 as a routine part of the microcontroller's operation. Such an ability for the microcontroller to essentially independently reprogram itself opens the door to microcontroller learning and adapting its program or program parameters to varying circumstances within its surroundings. For example, constants stored within the user program could be adjusted to compensate for drifting component values, environmental factors, running averages, minimum and maximum values encountered, etc.

SUMMARY OF THE INVENTION

The present invention relates generally to programming nonvolatile memory in a microcontroller. Objects, advantages and features of the invention will become apparent to those skilled in the art upon consideration of the following detailed description of the invention.

In one exemplary embodiment of the present invention a method and apparatus for programming nonvolatile (flash) memory in a microcontroller is provided. A nonvolatile memory in the microcontroller is connected via data, address and control signal paths to a processor internal to the microcontroller. These paths are not directly available to the outside world. In order to program the nonvolatile memory, a tester/programmer provides instructions to a test/control interface and the actual programming of the nonvolatile memory is carried out under control of a supervisory ROM forming a part of the microcontroller storing instructions which are carried out by the processor. Among other advantages, this provides the advantages of isolating the actual memory programming process within the processor and making the microcontroller more immune to attacks from intruders. The invention also permits the processor itself to invoke reprogramming of the nonvolatile memory without need of an external tester/programmer.

In a microcontroller having a processor, a control ROM, a RAM memory and a test/control interface consistent with an embodiment of the invention, a method of programming a program memory includes: at the test/control interface, receiving instructions and placing the instructions in an instruction queue; retrieving an instruction from the instruction queue, the instruction causing the processor to enter a programming mode; and upon entering the programming mode, the processor executing a control program stored in the control ROM to copy instructions from the RAM memory to the program memory.

A microcontroller consistent with an embodiment of the invention includes a processor that executes program instructions. A program memory is coupled to the processor by an address path, a data path and a control path, wherein information is stored in the user program memory under control of the processor. An interface receives instructions from outside the microcontroller, such instructions including an instruction to invoke programming the program memory.

A control program memory stores instructions that enable the processor to execute a in the program memory programing instruction.

Another microcontroller having an electronic storage medium residing thereon storing instructions which, when executed on a processor forming a part of the microcontroller, programs a program memory of the microcontroller in a manner consistent with an embodiment of the invention includes entering a program memory programming mode; instructing the processor to read the contents of a memory location in a RAM forming a part of the microcontroller; and copying the contents of the memory location into the program memory.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
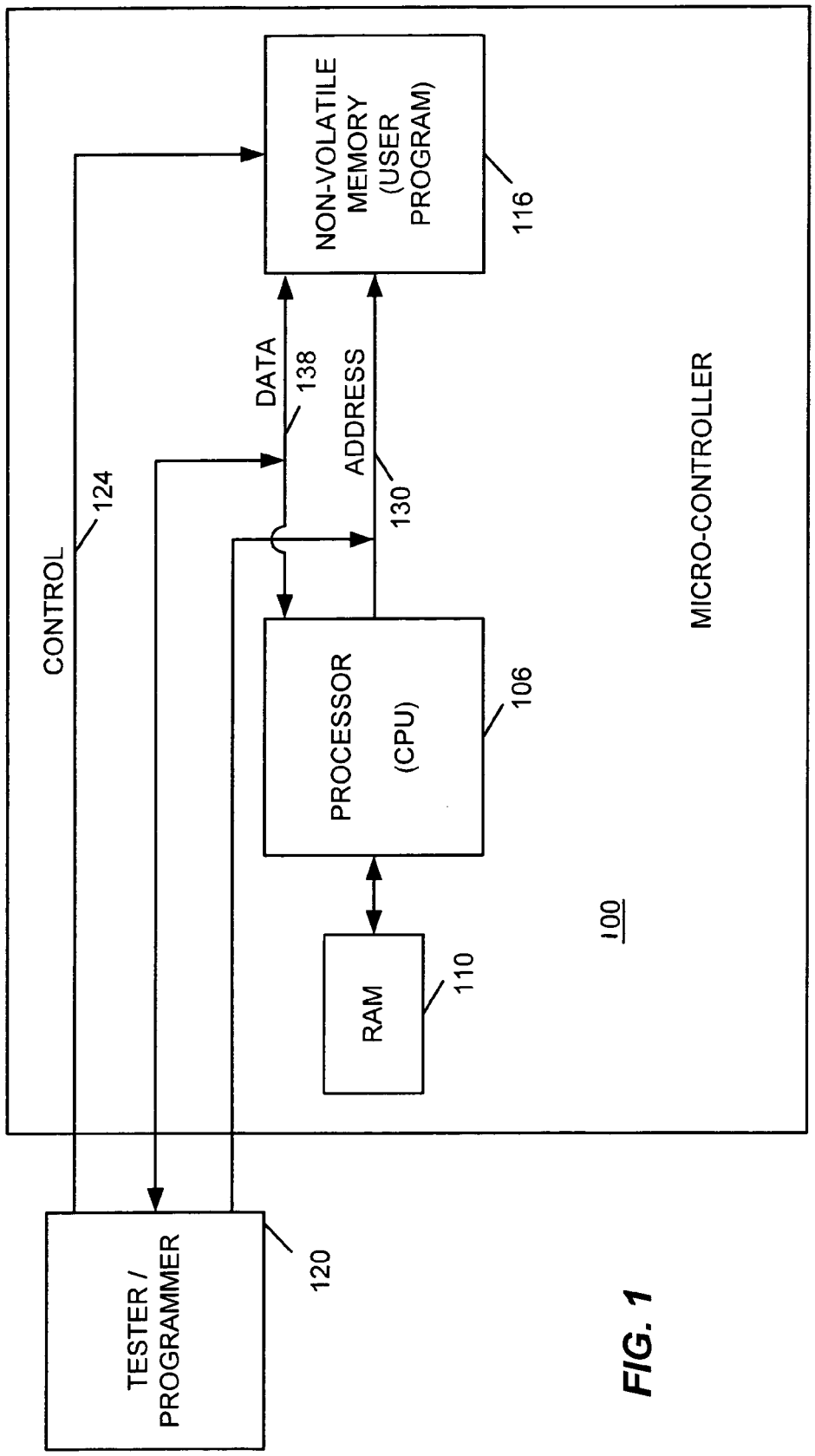
FIG. 1 is a block diagram of a microcontroller utilizing conventional programming techniques.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, or other symbolic representations of operations on data bits that may be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "receiving" or "copying" or "enabling" or "disabling" or "displaying" or recognizing or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Method and Apparatus for Programming a Flash Memory in Accordance With the Invention While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Figure 2:
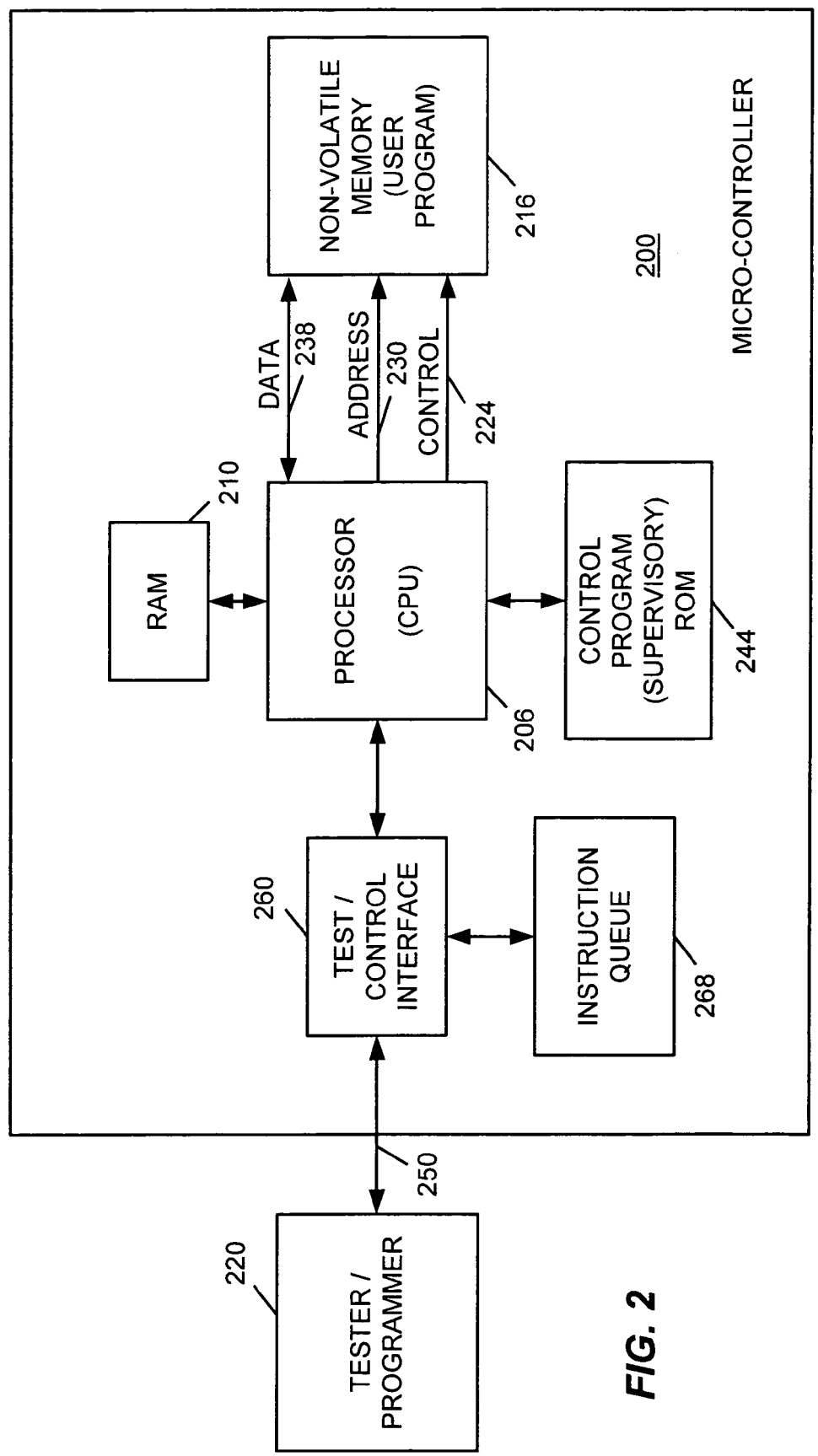
FIG. 2 is a block diagram of a microcontroller utilizing an embodiment of the present invention.

Referring now to FIG. 2, a microcontroller 200 consistent with an embodiment of the present invention is illustrated in which processor 206 is coupled to internal Random Access Memory (RAM) 210. Nonvolatile memory 216 (e.g., Flash memory) for storing a user program is connected to the processor 206 internally. A control path 224 is provided from processor 206 to nonvolatile memory 216. In addition, conventional address path 230 and data path 238 from processor 206 to memory 216 is provided. In addition to the RAM 210 and nonvolatile memory 216, microcontroller 200 includes a control program ROM (a supervisor ROM) 244 that contains hard-coded instructions used by processor 206 to directly program memory locations of nonvolatile memory 216. Thus, all programming of nonvolatile memory 216 is carried out by an internally stored process executing as a program on processor 206.

A tester/programmer 220 may be coupled to microcontroller 200 via a path 250 which, in the preferred embodiment, is a two wire bus carrying control, address and data information to an internal test/control interface 260. The tester/programmer 220 may be any suitable commercially available tester or programmer device that is or can be adapted to programming a programmable microcontroller. This includes those available from Cypress Microsystems (Bothell, Wash.). In addition, it should be noted that any suitable computer or workstation that is adapted to test or program a microcontroller can be considered a tester/controller 220 within the context of the present invention. The test/control interface 260 is coupled to processor 206 to provide the processor with program instructions and other test and control function instructions from the tester/programmer 220. Instructions from the tester/programmer 220 are stored in an instruction queue 268 for sequential retrieval and execution by processor 206.

Figure 3:
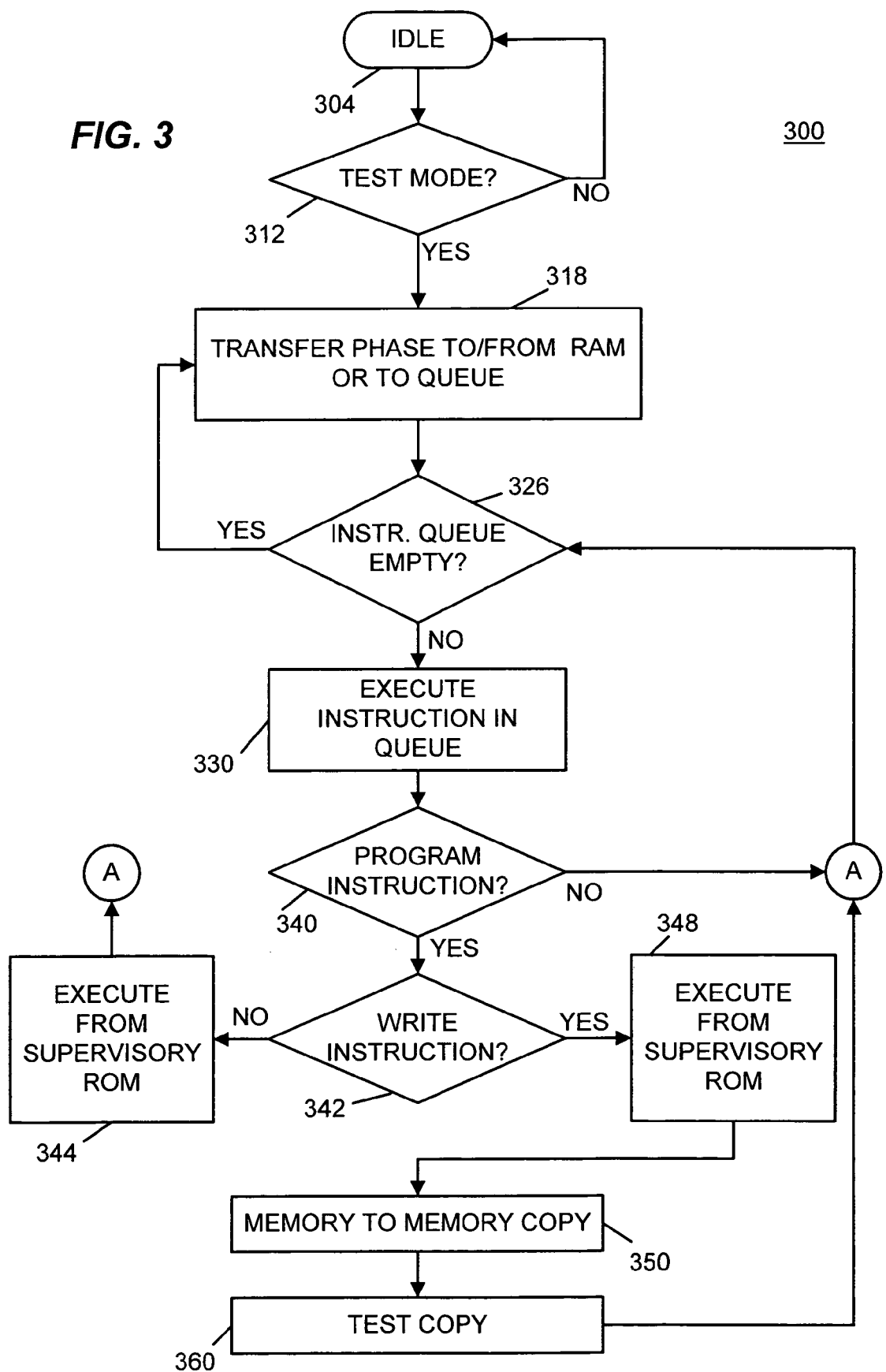
FIG. 3 is a flow chart describing the operation of an embodiment of programming using a tester/controller consistent with the present invention.

Although the preferred embodiment utilizes a two wire bus interface 250 to communicate with microcontroller 200, those skilled in the art will appreciate that other interconnections are possible including any suitable serial or parallel interface. However, use of a two-wire interface 250 provides a minimal number of I/O pads on the chip embodying microcontroller 200. In operation, the tester/programmer 220 may invoke a programming operation using process 300 as depicted in FIG. 3 starting at an idle state of the microcontroller at 304. Tester/programmer 220 invokes the test/control mode (i.e., a supervisory mode) at 312 by issuing an appropriate control command to test/control interface 260. Upon receipt of such a command, a transfer phase begins at 318 where transfers can be made to or from RAM or to the instruction queue 268. Transfers can only be made during this transfer phase, thus providing a level of security against intruders since the actual programming of the non-volatile memory only occurs outside the transfer phase.

Once the microcontroller 200 is in the transfer phase, data to be written to the nonvolatile memory is transferred from the tester/programmer 220 to RAM memory 210 at 318. Also during the transfer phase, instructions can be placed in the instruction queue 268. In the present embodiment, all such transfers are bidirectional. Processor 206 continues to periodically inspect the instruction queue 268 to determine if an additional instruction is there for retrieval. If the queue is empty, control passes back to 318 to await the next transfer. If the queue is not empty at 326, the next instruction is retrieved and executed at 330 by processor 206 from the instruction queue 268. Various test and control instructions may be placed by in the queue whenever the test/control mode is invoked and those instructions are periodically retrieved and executed at 330 until the processor detects an instruction invoking the commencement of programming of nonvolatile memory 216 at 340. Once processor 206 detects the instruction invoking the programming mode at 340, processor 206 begins executing a programming routine from a supervisory program stored in control program ROM 244. If the program mode instruction is not a write instruction, control passes to 344 where the instruction is executed per the program stored in the supervisory ROM 244 and the instruction queue is checked to determine whether the instruction queue is empty at 326. On the other hand if the program mode instruction is a write instruction, control passes to 348 where the instruction is executed per the program stored in the supervisory ROM 244. A memory to memory copy is then carried out at 350 to transfer the data in RAM memory 210 to nonvolatile memory 216 under control of processor 206.

When the copy is complete the processor may invoke a test at 360 to determine that an accurate transfer has been carried out. This may be accomplished by a simple comparison of memory contents in RAM 210 with those in 216 or using any other process to assure the integrity of the transfer. In other embodiments, such a test may be omitted to enhance the speed of the transfer. Once the copy has been verified, the process returns to 326 to retrieve the next instruction from the instruction queue (if present) at 318. During the actual process of writing to the non-volatile memory 216, the test/controller interface 260 and the instruction queue 268 are effectively disabled by virtue of not being in the transfer phase of 318. This helps assure that the programming process is not disrupted or tampered with once initiated.

In accordance with the present invention, variations may be made to the exact process described above. For example, data may be transferred to RAM 210 at other times then that shown in process 300. For example, the data may be written there as a part of the normal operational mode, or intermingled with instructions from the tester/programmer 220 prior to the programming command. Many other variations in the process will occur to those skilled in the art. During the actual programming of the nonvolatile memory 216, microcontroller 200 essentially isolates itself from the tester/programmer by disabling test/control interface 260 and instruction queue 268 (by virtue of leaving the transfer phase of 318) to minimize the possibility of an intruder attempting to tamper with the programming process. The actual control process used to program the nonvolatile memory 216 may be made completely independent of the tester/programmer since each individual microcontroller 200 includes hard-coded instructions for carrying out the programming in control program ROM 244. Thus, the same tester/programmer might be used to control numerous microcontrollers having different internal processes for carrying out the programming.

Figure 4:
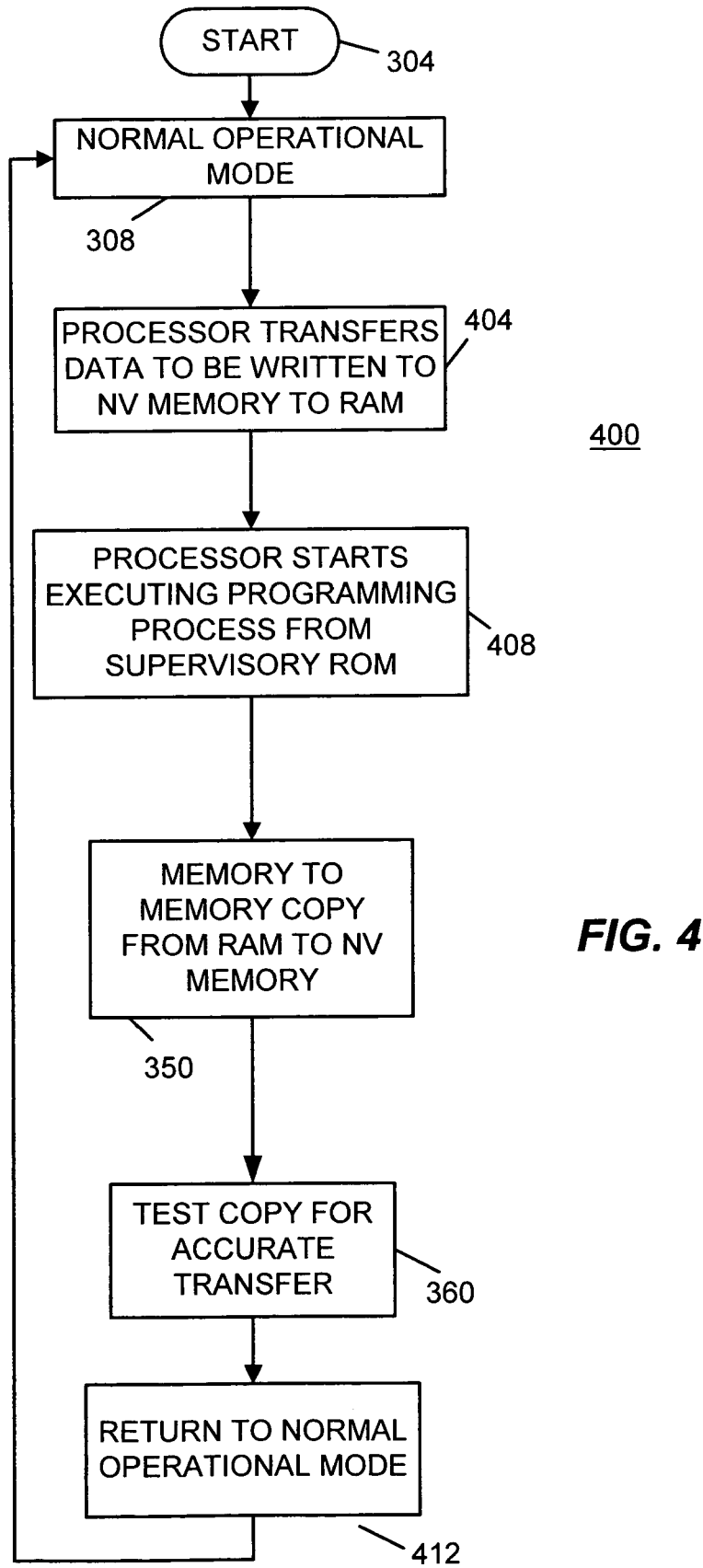
FIG. 4 is a flow chart describing the operation of an embodiment of programming invoked by the microcontroller processor consistent with the present invention.

Referring now to FIG. 4, the present invention also permits microcontroller 200 to invoke a re-programming of all or part of nonvolatile memory 216 "on the fly" as a part of its normal operation. Process 400 of FIG. 4 broadly describes this function starting at 304 where the microcontroller 200 is powered up and initialized as previously and enters the normal mode of operation at 308. During normal operation at 404, processor 206 transfers into RAM 210 data that is or is intended to be programmed or written into the nonvolatile memory. That is, a snapshot of the information to be transferred to nonvolatile memory is placed in RAM 210 so that it can later be copied. The transfer at 404 is carried out under the instructions stored in nonvolatile memory 216 forming a part of the user program. Also forming a part of the user program is an instruction to begin executing a programming operation on nonvolatile memory 216 at 408. Thus, under instructions stored in memory 216, processor 206 may invoke a reprogramming of the nonvolatile memory 216 itself without the need for the tester/programmer 220. A memory to memory copy from RAM to nonvolatile memory is carried out at 350 until the copy is complete. A test may then be carried out for accuracy of the copy at 360 if desired after which the user program resumes operation in the normal operational mode at 412 and control returns to 308.

The present invention provides enhanced security by virtue of isolating not only the control lines, data lines and address lines of the nonvolatile memory from the tester/programmer but also isolates the tester/programmer from the actual process used to effect the programming or re-programming of the nonvolatile memory 216. Thus, proprietary methods for invoking the actual programming of the nonvolatile memory 216 may be securely retained within the secure environment of the microcontroller 200 itself without having to be revealed to the outside world in any way. Thus, the invention as described provides substantially enhanced security against intruders attempting to program or re-program the nonvolatile memory 216. Moreover, the above described invention permits the processor itself to reprogram the memory and thereby adapt in a manner heretofore unavailable in microcontrollers.

Those skilled in the art will recognize that the present invention has been described in terms of exemplary embodiments based upon programming nonvolatile memory within a microcontroller; however, the present invention should not be so limited. The present invention could be implemented using hardware component equivalents such as special purpose processors, micro-processors and the like which are equivalents to the invention as described and claimed. Moreover, although described in connection with programming a nonvolatile memory such as a Flash memory (and in one embodiment, a SONOS—Semiconductor Oxide Nitride Oxide Semiconductor—based flash memory using 0.35 micron processes and below), the technique could equally well be used to program a region of volatile memory such as RAM memory without departing from the present invention.

The present invention is preferably implemented using a programmed processor executing programming instructions that are broadly described above in flow chart form. Such instructions may be stored in any suitable electronic programming medium. However, those skilled in the art will appreciate that the processes described above may be implemented in any number of variations and in many suitable programming languages without departing from the present invention. For example, the order of certain operations carried out can often be varied, and additional operations may be added without departing from the invention. Error trapping may be added and/or enhanced and variations may be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. In a microcontroller having a processor, a control ROM, a RAM memory, a test/control interface and a non-volatile program memory, said microcontroller comprising an independent integrated circuit, a method of programming said non-volatile program memory, comprising:
    transferring data within said microcontroller from said processor to said RAM memory according to an invoke instruction stored in said non-volatile program memory, said invoke instruction comprising a part of a user program; and
    executing said user program to copy said data from said RAM memory within the microcontroller to said non-volatile program memory within said microcontroller, wherein said user program is executed on the fly during a normal operation of said microcontroller; and
    upon executing said user program with said test/control interface:
    at said test/control interface within said microcontroller, receiving instructions and placing said instructions in an instruction queue, wherein an address path, a data path, and a control path, each said path within said microcontroller, for the user program are isolated from said test/control interface within said microcontroller;
    retrieving a programming mode instruction from said instruction queue within said microcontroller, said programming mode instruction causing said processor to enter a programming mode; and
    upon entering said programming mode, said processor executing a control program stored in said control ROM to copy instructions from said RAM memory to said non-volatile program memory within said microcontroller.

2. The method according to claim 1, wherein said non-volatile program memory comprises a Flash memory.

3. The method according to claim 1, wherein said non-volatile program memory stores an instruction that when encountered invokes the control program residing in the control ROM to enable the processor to store information in the program memory without receipt of an instruction via the test/control interface.

4. The method according to claim 1, further comprising disabling the instruction queue and the test/control interface upon entering the programming mode.

5. The method according to claim 4, further comprising enabling the instruction queue and the test/control interface after instructions are copied from the RAM to said non-volatile program memory.

6. The method according to claim 1, further comprising storing an instruction to be copied into said non-volatile program memory in the RAM.

7. The method according to claim 1 wherein said test/control interface is coupled to said non-volatile program memory through at least one intermediate component.

8. The method according to claim 1 wherein said instruction queue is coupled to said non-volatile program memory through at least one intermediate component.

9. A microcontroller configured in an independent integrated circuit, said microcontroller comprising:
    a processor that executes program instructions;
    a user program memory coupled to the processor by an address path, a data path and a control path within said microcontroller, wherein information is stored in the user program memory under control of the processor, said user program memory programmable on the fly during a normal operation of said microcontroller in response to an invoke instruction, said invoke instruction stored within said user program memory and accessed with said processor from said paths within said microcontroller;
    an interface within said microcontroller that receives instructions from outside the microcontroller, such instructions including an instruction to invoke programming the user program memory, wherein the address path, the data path, and the control path within said microcontroller are isolated from the interface within said microcontroller; and
    a control program memory storing instructions that enable the processor to execute the programming instruction in the user program memory, wherein said programming instruction is accessed with said processor from within said microcontroller.

10. The microcontroller according to claim 9, wherein the program memory comprises a nonvolatile memory.

11. The microcontroller according to claim 9, wherein the program memory comprises a Flash memory.

12. The microcontroller according to claim 9, wherein the program memory stores an instruction invoking the program residing in the control program memory to enable the processor to carry out the process of storing information in the user program memory without receipt of an instruction via the interface.

13. The microcontroller according to claim 9, wherein the instruction causing the processor to enter a programming mode is queued in an instruction queue, wherein the interface comprises a test/control interface, and wherein the control program memory contains instructions that disable the instruction queue and the interface prior to storing information in the program memory.

14. The microcontroller according to claim 13, wherein the control program memory contains instructions that enable the instruction queue and the interface after storing information in the program memory.

15. The microcontroller according to claim 13 wherein said instruction queue is coupled to said user program memory through at least one intermediate component.

16. The microcontroller according to claim 9, further comprising a RAM memory, and wherein the process of storing information in the program memory includes copying information from the RAM memory to the program memory.

17. The microcontroller according to claim 9 wherein said interface is coupled to said user program memory through at least one intermediate component.

18. A microcontroller configured in an independent integrated circuit, said microcontroller comprising an electronic storage medium that stores instructions which, when executed on a processor comprising part of said microcontroller, programs a program memory of said microcontroller with a process comprising:

transferring data within said microcontroller from said processor to a RAM comprising part of said microcontroller according to an instruction stored in said program memory within said microcontroller, said instruction comprising a part of a user program; and executing said user program to copy said data within said microcontroller from said RAM memory within the microcontroller to said program memory, wherein said program memory is programmed on the fly during a normal operation of said microcontroller; and upon receiving a programming mode instruction from an instruction queue and executing said programming instruction with a test/control interface within said microcontroller comprising a part of said microcontroller:

entering a program memory programming mode;

instructing said processor to read the contents of a memory location in said RAM, wherein an address path, a data path, and a control path, each said path within said microcontroller, for programming said program memory are isolated from said test/control interface within said microcontroller; and copying the contents of the memory location within said microcontroller into said program memory within said microcontroller.

19. The microcontroller of claim 18, the process further comprising disabling the instruction queue and the test/control interface upon entering the programming mode.

20. The microcontroller of claim 19, the process further comprising enabling the instruction queue and the test/control interface after instructions are copied from the RAM to the program memory.

21. The microcontroller of claim 20 wherein said instruction queue is coupled to said program memory through at least one intermediate component.

22. The microcontroller of claim 18, wherein the electronic storage medium comprises a read only memory (ROM).

23. The microcontroller of claim 18, wherein the program memory comprises a nonvolatile memory.

24. The microcontroller of claim 18, wherein the program memory stores an instruction that when encountered invokes the program memory programming mode.

25. The microcontroller of claim 18 wherein said test/control interface is coupled to said program memory through at least one intermediate component.

* * * * *